United States Patent [19]

Funabashi et al.

[11] Patent Number: 4,802,815
[45] Date of Patent: Feb. 7, 1989

[54] INDUSTRIAL ROBOT

[75] Inventors: Takanori Funabashi, Hirakata; Akiyoshi Nakada, Suita; Haruo Tada, Kobe, all of Japan

[73] Assignee: Matsushita Electric Industrial Co., Ltd., Osaka, Japan

[21] Appl. No.: 767,268

[22] PCT Filed: Dec. 12, 1984

[86] PCT No.: PCT/JP84/00586
§ 371 Date: Aug. 6, 1985
§ 102(e) Date: Aug. 6, 1985

[87] PCT Pub. No.: WO85/02577
PCT Pub. Date: Jun. 20, 1985

[30] Foreign Application Priority Data

Dec. 15, 1983 [JP] Japan ............... 58-236618

[51] Int. Cl.4 ............................................. B25J 17/00
[52] U.S. Cl. ......................................... 414/680; 414/8; 901/15; 901/28
[58] Field of Search .................. 901/15, 27, 28, 29, 901/49, 50; 29/722; 310/88; 414/8, 680, 744 R; 15/319

[56] References Cited

U.S. PATENT DOCUMENTS

| 3,041,117 | 6/1962 | Ramsey | 310/88 X |
| 3,507,163 | 4/1970 | Jennrich et al. | 414/8 X |
| 3,543,592 | 12/1970 | Haaker et al. | 414/8 X |
| 3,560,066 | 2/1971 | Jelatis et al. | 414/8 X |
| 3,919,574 | 11/1975 | Schmuck | 310/88 X |
| 4,191,385 | 3/1980 | Fox et al. | 29/722 X |
| 4,212,575 | 7/1980 | Patrick et al. | 414/8 |
| 4,399,585 | 8/1983 | Kullik et al. | 15/319 |
| 4,426,920 | 2/1983 | Chesley | 414/8 |
| 4,499,790 | 2/1985 | Helms | 901/26 X |
| 4,555,216 | 11/1985 | Buschor | 414/8 X |
| 4,697,978 | 10/1987 | Tada et al. | 901/28 X |

FOREIGN PATENT DOCUMENTS

| 2473150 | 1/1980 | France . |
| 51-6950 | 3/1976 | Japan . |
| 55-87649 | 7/1980 | Japan . |
| 56-17187 | 4/1981 | Japan . |
| 57-19277 | 4/1982 | Japan . |
| 2228598 | 2/1974 | Netherlands . |

OTHER PUBLICATIONS

G. J. Horky, IBM Technical Disclosure Bulletin, vol. 26, No. 7B, Dec. 1983.

Primary Examiner—Frank E. Werner
Assistant Examiner—Donald W. Underwood
Attorney, Agent, or Firm—Stevens, Davis Miller & Mosher

[57] ABSTRACT

A dust-free industrial robot of high performance includes an internal air space substantially closed by arms, articulation members, bearings or covers or a combination thereof in a manner to separate the rotating, sliding and contacting portions of structural elements such as the arms, articulation members, bearings and a drive source from the outside air. The air pressure in the internal air space is made lower than that of the outside air to prevent dust produced during the operation of the robot from being scattered to the outside air.

11 Claims, 4 Drawing Sheets ical parts.

INDUSTRIAL ROBOT

TECHNICAL FIELD

The present invention relates to an industrial robot adapted for use in factories which have to be kept away from dust, such as factories for manufacturing semiconductors, optical parts and other precise parts.

BACKGROUND OF THE INVENTION

In general, an industrial robot has many dust generating parts such as bearings of articulates, brushes of servomotors and so forth. When such an industrial robot is used in a factory where air has to be kept extremely clean, it is necessary to take a suitable measure for preventing dust from being scattered into the air from the robot.

For instance, conventional industrial robots for use under such clean conditions are equipped with bellows-type covers 2 which surround respective articulates 1a which constitute dust sources, in order to prevent dust from being scattered into the ambient air.

This known dust prevention measures, however, involves problems in that the covers 2 acts as pumps upon expansion and contraction thereof to discharge dust together with air from the articulations through gaps between the covers 2 and the robot 1. In addition, the covers which are large in size disadvantageously increase the size of the robot as a whole. Moreover, a laborius work is required for demounting and mounting the covers 2 before and after repair or maintenance.

DISCLOSURE OF THE INVENTION

The invention provides a compact size industrial robot which does not require a bellows type cover and which is easy to repair and maintain. It includes a plurality of arms, one or more articulation members or sliding articulation members each connected to each of said plurality of arms, bearings for rotatably or slidably supporting said articulation members or said sliding articulation members, drive source means for relatively rotating, swiveling or sliding said plurality of arms through said articulation members or said sliding articulation members, the end of the arm attached to the tip end of said plurality of arms being adapted to be positioned at any position in a space, internal air spaces substantially closed by said arms, said articulation members, said bearings or cover means or the combination thereof in a manner to separate the rotating, sliding and contacting portions of said arms, said articulation members and said drive sources from the outside air, and negative pressure generating means for sucking air contained in the internal air spaces to make the air pressure therein lower than that of the outside air. The latter serves to produce pressure gradients in the small clearances connecting the inside of the substantially closed robot to the outside thereof. This makes the air pressure inside of the robot lower than that of the outside air, and prevents dust in the robot from being scattered to the outside air.

THE BEST MODE FOR CARRYING OUT THE INVENTION

An embodiment according to the invention will be described hereinbelow with reference to FIGS. 2 to 5.

Figure 1:
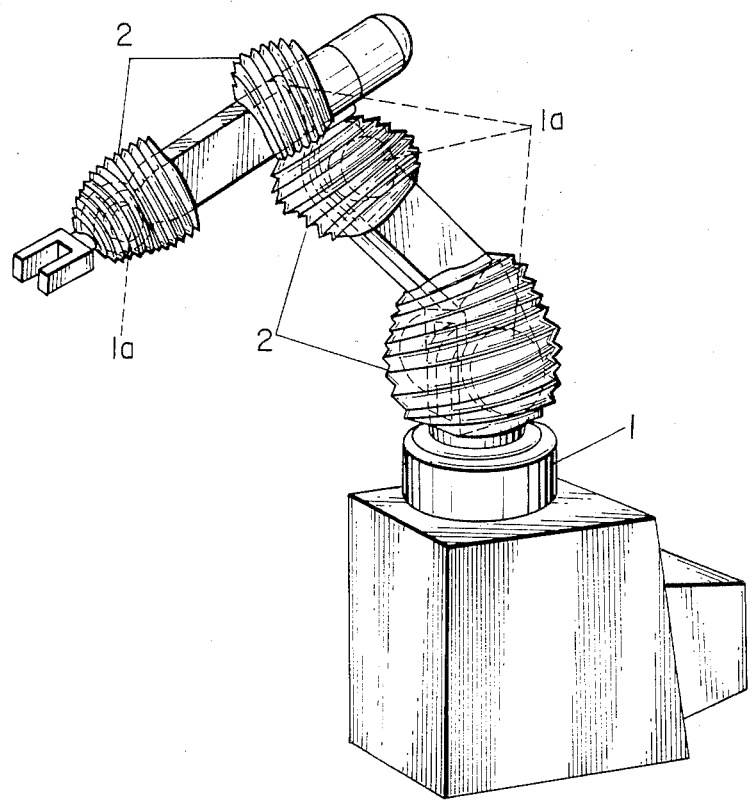
FIG. 1 is a perspective view of a prior industrial robot having a means for preventing scattering of dust.
Figure 2:
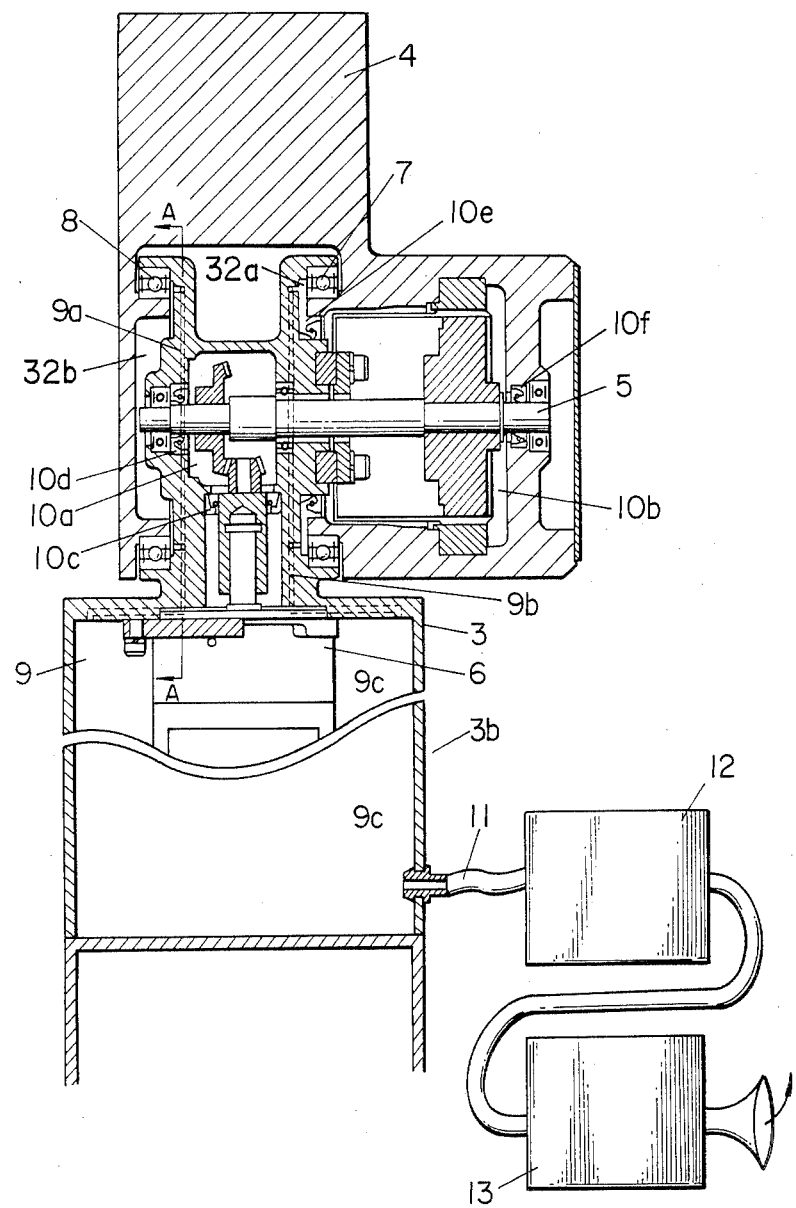
FIG. 2 is a fragmentary sectional view of an essential part of an industrial robot of an embodiment of the invention having a means for preventing scattering of dust.

FIG. 2 shows an articulation of an industrial robot provided with a dust scattering prevention means in accordance with the invention. A reference numeral 3 denotes a stationary arm of the articulation arm, while 4 denotes a driven arm of the articulation. A numeral 5 designates a main shaft 5. A servomotor 6 is fixed to the stationary arm 3 to drivingly rotate the main shaft 5 thereby driving the driven arm 4. Numerals 7 and 8 denote bearings through which the driven arm 4 is rotatably supported on the stationary arm 3. Numerals 9a and 9b denote air passages provided in the stationary arm 3 and leading to a cavity 9c formed in the stationary arm 3, from the portions near the inner peripheries of the bearings 7, 8. The air passages 9a, 9b, the cavity 9c and internal air chamber 32a and 32b constitute an internal air space 9. Numerals 10a and 10b denote a reduction gear chamber accommodating a reduction gear for reducing the speed of the servomotor 6. Numerals 10c, 10d and 10e designate oil seals disposed between the portions 10a, 10b of the reduction gear chamber and the internal air space 9, while a numeral 10f denotes an oil seal provided in the other end of the portion 10b of the reduction gear chamber. A numeral 11 denotes a pipe through which air and dust are sucked from the cavity 9c in the stationary arm 3, by the action of a negative pressure generator 12. A numeral 13 denotes an air cleaner for removing the dust in the air sucked by the negative pressure generator and discharging cleaned air.

Figure 3:
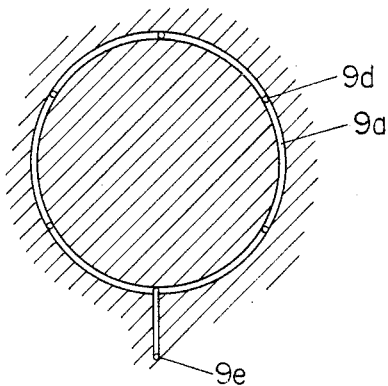
FIG. 3 is a sectional view of an air passage taken along the line A—A of FIG. 2.

Referring now to FIG. 3 which is a sectional view taken along the line A—A in FIG. 2, the air passage 9a mentioned before is communicated with an area near the inner periphery of the bearing 8 through vent holes 9d, and also with the cavity 9c through a vent hole 9e.

Figure 4:
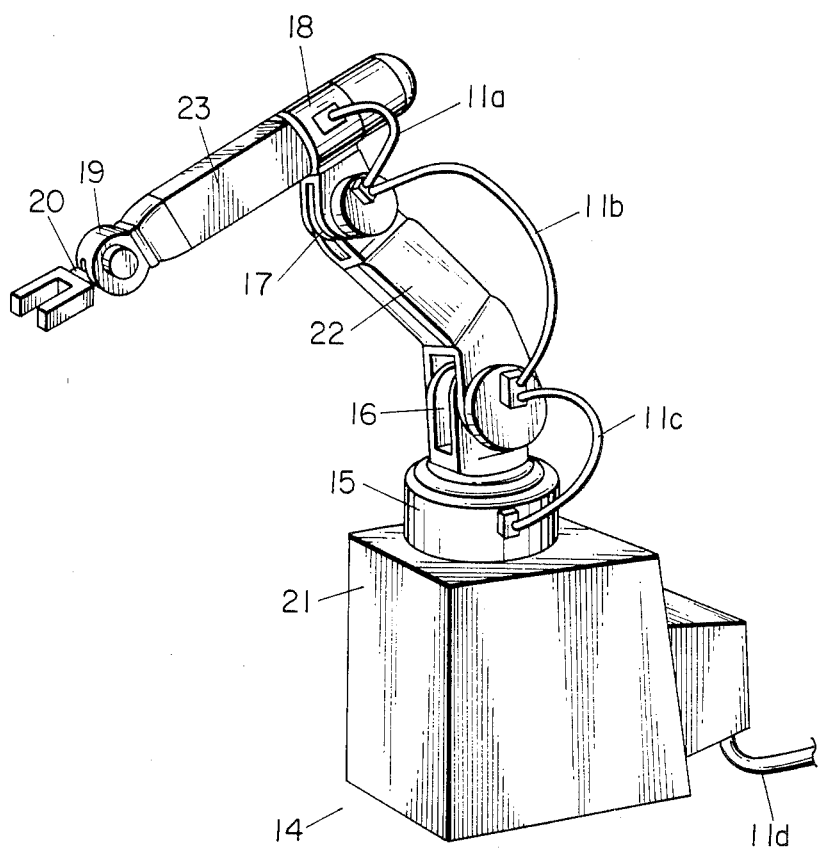
FIG. 4 is a perspective view of the general constitution of an industrial robot embodying the invention.

FIG. 4 is a perspective view of an industrial robot embodying the present invention. A numeral 14 denotes a body of the robot, 15 a swivel articulation, 16, 17 bending articulations, and 18, 19, 20 wrist articulations. The swivel articulation 15 is substantially closed by a cover 21, and 22 denotes an upper arm and 23 a forearm. The internal air spaces of respective articulations are communicated with the negative pressure generator 12 through tubes 11a to 11d.

Figure 5:
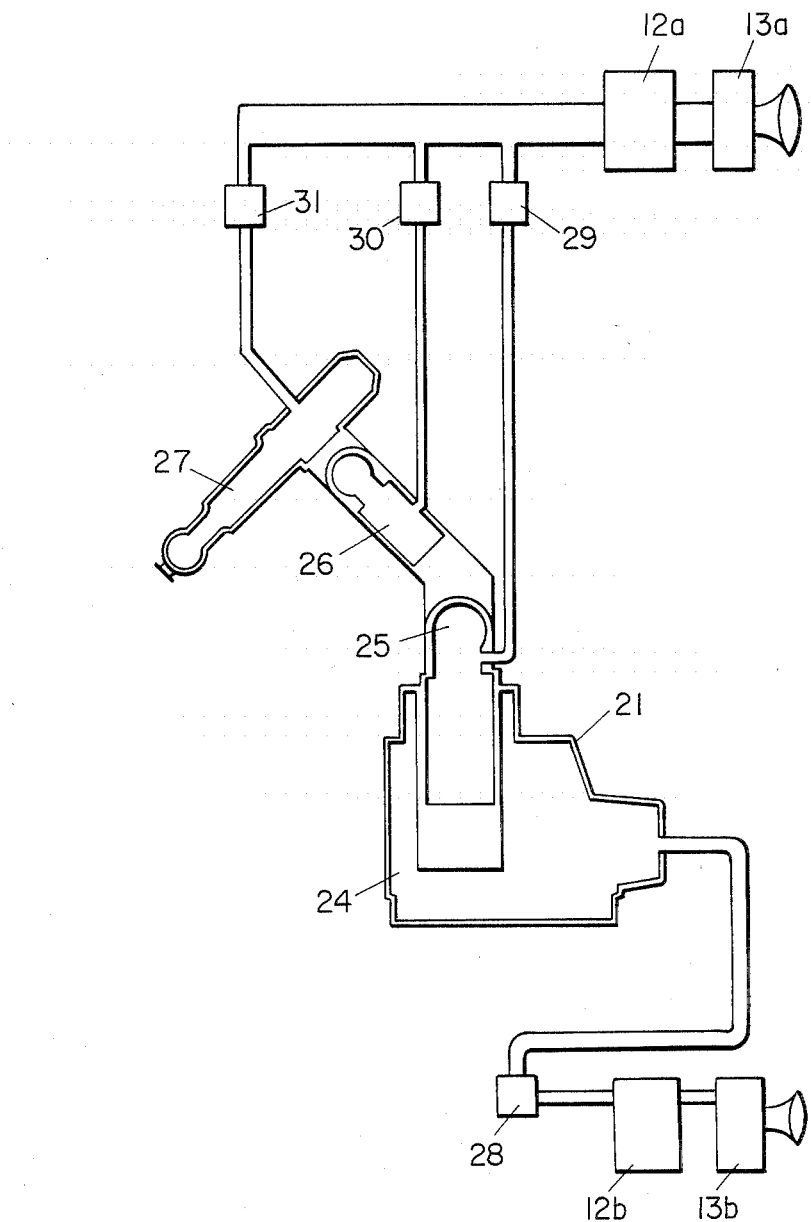
FIG. 5 is a schematic view of a connection between substantially closed internal air spaces of the industrial robot and a negative pressure generator.

FIG. 5 shows the manner in which the substantially closed internal air space of the articulations of the robot shown in FIG. 4 is communicated with the negative pressure generator.

There are shown four internal air spaces: namely, a first internal air space 24 defined by the cover 21 covering the swivel articulation 15, a second internal air space 25 defined in the bending articulate 16, a third internal air space 26 defined in the bending articulation 17 and the upper arm 22, and a fourth internal air space 27 defined in the wrist articulations 18, 19, 20 and the forearm 23. A reference numeral 28 denotes a flow rate regulator adapted for regulating the flow rate of air sucked from the first internal air space, while 29, 30 and 31 denote, respectively, pressure regulators for regulating the pressures in the second, third and fourth internal air spaces 25, 26 and 27. A reference numeral 12a denotes a high/low pressure type negative pressure generator 12a, 13a an air cleaner 13a. 12b large-flow-rate type negative pressure generator 12b, and 13b and air cleaner 13b.

The operation of the thus constructed industrial robot is as follows.

During the operation pf the robot, dusts are generated from various parts of the robot such as the meshing portions of the gears, bearings, oil seals, motor brushes and so forth. The dusts tend to be discharged to the ambient air through the gaps in the bearings and covers. Thus, these gaps are materially regarded as being dust sources of the robot as a whole. With the arrangement shown in FIG. 2, the air in the internal air space 9 flows out through gaps associated with the bearings 7 and 8, so that these gaps constitute the material dust sources. Accordingly, dust can be prevented from being scattered if leakage of dust through these gaps are completely avoided. As a matter of fact, however, it is difficult to keep these gaps completely airtight since these gaps are provided in movable parts of the robot. In this regard, the air pressure about the bearings 7 and 8 can be reduced relative to the pressure of the outside air by sucking the air in the air passages 9a and 9b provided inside or the bearings 7 and 8 to another place, with the result that air is caused to flow from outside of the bearings and to the inside thereof, thereby preventing dust from being discharged to the outside of the robot. In the embodiment described above, the air passages 9a and 9b are communicated with the cavity 9c, from which air is discharged through the pipe 11 by means of the negative pressure generator 12. With such arrangement, the air pressure in the cavity 9c can be prevented from being increased in spite of the temperature rise of the servomotor 6 and can normally be rendered negative relative to the pressure of the ambient air, thereby enabling preventing leakage of dust through small gaps between the parts of the robot. The air discharged from the negative pressure generator 12 is discharged to the environment after it is relieved of dust by means of the air cleaner 13.

The reduction gear chamber 10a and 10b is oil-lubricated and is made liquid tight by the oil seals 10c, 10d, 10e and 10f to eliminate leakage of the lubricating oil to the outside. If the vapor of the lubricating oil should leak outside through the oil seals 10c, 10d or 10e, it would not be scattered to the environment since it is discharged from the internal air space 9 through the pipe 11 by means of the negative pressure generator 12. In addition, the area on the side of the oil seal 10f is completely closed by the driven arm 4 to be adequately separated from the outside air.

The fundamental effects described above can be applied to the case of an industrial robot shown in FIG. 4 which has multiple degrees of freedom and a plurality of internal air spaces as shown in FIG. 5. The operation in the embodiment shown in FIG. 5 will be described hereinbelow. The robot has four internal air spaces, of which second, third and forth internal air spaces contain bearings as dust sources, as in the case of the embodiment shown in FIG. 2. These bearings are of a sealed type and areas of clearances therein are small. On the one hand, these bearings are located near a work handled by the robot, so that they need be of highly dust-free characteristics. In this regard, a vacuum pump is used in a negative pressure generator 12a and pressure gradients about the respective bearings are adjustably balanced by means of pressure regulators 29, 30 and 31 to attain high dust-free characteristics. The first internal air space 24 is surrounded primarily by a cover 21 which presents a relatively large gap area. To compensate for this, an exhaust fan having a large capacity is used in the negative pressure generator 12b and a flow rate of discharge is adjusted by a flow regulator 28 to prevent scattering of dust.

In the above embodiments, the invention has been described with respect to an industrial robot having articulations which are adapted to swivel or pivot relative to one another. The invention, however, is not limited to such type of industrial robot but can be applied to an industrial robot of the type having sliding articulations which permit a plurality of arms to linearly move to one another.

INDUSTRIAL APPLICABILITY

As apparent from the foregoing description, the invention provides the following advantages.

(1) The interior of the robot body is made closed separately from the ambient air and negative pressure is produced in the internal air spaces, so that dust generated during the operation of the robot is prevented to embody a dust-free industrial robot of high quality.

(2) The robot body is made compact and is easy for maintenance and inspection.

(3) Even when operations are conducted in a decompression room or plenum room, the pressure in the internal air spaces within the robot body is made negative relative to the room pressure to readily embody a dust-free industrial robot of a high performance.

(4) The bearings need not be of an oil free type, and so it is possible to provide an industrial robot which is inexpensive, reliable and durable.

What is claimed is:

1. In an industrial robot including a stationary arm and a driven arm for constituting articulations, bearing means for rotatably supporting said driven arm relative to said stationary arm, and a driven source provided in said stationary arm for swiveling said driven arm relative to said stationary arm, the tip end of said driven arm being adapted to be positioned at any position in a space, the improvement comprising an internal air chamber formed by substantially closing a space surrounded by said stationary arm, said driven arm and said bearing means in a manner to separate the same from the outside air; and air passage provided in a wall of said stationary arm, said air passage being in communication with an area of said internal air chamber near an inner peripheral side of said bearing means and connecting said internal air chamber to a cavity provided within aid stationary arm; negative pressure generating means for sucking air contained in said cavity, said air passage and said internal air chamber to make the air pressure therein lower than the pressure of the outside air; and piping means for connecting said negative pressure generating means to said cavity.

2. An industrial robot as set forth in claim 1, further comprising an air cleaner communicated to the suction side of said negative pressure generating means.

3. An industrial robot as set forth in claim 1, wherein said negative pressure generating means comprises a vacuum pump.

4. An industrial robot as set forth in claim 1, wherein said negative pressure generating means comprises an exhaust fan.

5. An industrial robot, comprising
   (a) a stationary arm and a driven arm,
   (b) bearing means for relatively and rotatably supporting said stationary arm and said driven arm,
   (c) a gear box means provided between said stationary arm and said driven arm for containing therein reduction gears which serve to drive said driven arm relative to said stationary arm,
   (d) motor means for driving the gears within said gear box,
   (e) said bearing means, said driven arm and said stationary arm defining a substantially closed internal air chamber to separate said internal air chamber from the outside air,
   (f) air passage means formed within a wall of said stationary arm and opened to said internal air chamber, and
   (g) negative pressure generating means for communicating with said air passage means for making air pressure in said internal air chamber lower than outside air pressure.

6. An industrial robot as set forth in claim 5, further comprising an air cleaner communicated to the suction side of said negative pressure generating means.

7. An industrial robot as set forth in claim 5, wherein said negative pressure generating means comprises a vacuum pump.

8. An industrial robot as set forth in claim 5, wherein said negative pressure generating means comprises an exhaust fan.

9. In an industrial robot including a stationary arm; a driven arm; bearing means for rotatably connecting said stationary arm and said driven arm relative to each other; and gear box means disposed between said stationary arm and said driven arm and including (i) reduction gear means for drivingly rotating said stationary arm and said driven arm relative to one another and (ii) sealing means for sealing an interior space defined by said gear box means; the improvement wherein one of said stationary arm and said driven arm is at least partially enclosed within a space defined by the other of said stationary arm and said driven arm; said sealing means, said bearing means, said stationary arm and said driven arm defining an internal chamber; said stationary arm including a wall having an internal air passage in communication with said internal chamber, said air passage being adapted to be connected to a negative pressure generating means for maintaining said internal chamber at a negative pressure upon actuation of said negative pressure generating means.

10. An industrial robot as set forth in claim 9, further comprising an air cleaner communicated to the suction side of said negative pressure generating means.

11. An industrial robot as set forth in claim 9, wherein said negative pressure generating means comprises a vacuum pump.

* * * * *